2,901,497
Patented Aug. 25, 1959

2,901,497
PRODUCTION OF AROMATIC ISOCYANATES

Detlef Delfs, Opladen, and Ferdinand Münz, Koln-Stammheim, Germany, assignors, by mesne assignments, of one-half to Mobay Chemical Company, Pittsburgh, Pa., a corporation of Delaware No Drawing. Application April 9, 1954
Serial No. 422,276

Claims priority, application Germany April 11, 1953

7 Claims. (Cl. 260—453)

This invention relates to improvements in the production of aromatic isocyanates.

It is well known to produce aromatic isocyanates by causing phosgene to react with the hydrochlorides of the corresponding amines. In carrying out the conventional process, the dry hydrochloride of the aromatic amine serving as the starting material for the phosgenation is suspended in an inert diluent, such as xylene, chlorobenzene, and o-dichlorobenzene, and treated with phosgene at a temperature ranging from about 130 to 180° C. This method has the disadvantage that it must be effected at temperatures which assist the polymerization of the isocyanate formed, particularly in the case of isocyanates containing more than one isocyanato group. This polymerization accounts for the formation of resinous residues, remaining in the still upon distillation of the diluent and the isocyanate formed. In the case of non-distillable isocyanates it may be very difficult to separate the same from the resinous polymerization products. On the other hand, the formation of polymerization products may not be remedied by using lower temperatures, since at lower temperatures longer reaction times, which also act beneficially on the polymerization, are required.

It is an object of the present invention to provide a process for the production of aromatic di- and polyisocyanates without the formation of resinous by-products. Another object is to provide a process for the manufacture of aromatic di- and polyisocyanates in good yield and in a high state of purity. Further objects will appear hereinafter.

Very surprisingly it has now been found that the phosgenation velocity of the hydrochlorides of aromatic amines containing more than one amine group depends to a large extent on the manner in which the hydrochloride has been produced, the nature of the solvent used in the production of the hydrochloride being particularly important. Thus, it has been established that solvents having the general formula

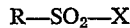

R—SO$_2$—X in which R stands for a monovalent aromatic radical and X for a low-molecular aliphatic radical, fluorine, the phenoxy group, or a dialkylamino group, act beneficially in that the hydrochlorides produced in these solvents may be phosgenated at temperatures as low as 100° C. within a few hours.

Furthermore, it has been found that at low temperatures, e.g. at temperatures around 20° C., the hydrochlorides of the amines are precipitated in form of a jelly-like mass, whereas at high temperatures, e.g. at temperatures around 150° C., conglomerations of coarse crystals are obtained. In both cases, the reaction time required for the phosgenation is long and the yield of the isocyanate formed in the phosgenation is unsatisfactory. It is therefore advisable to produce the hydrochlorides by introducing hydrogen chloride into the amine solution at a temperature within a definite range. This range has been found to lie between 50 to 100° C. although in some instances somewhat lower or higher temperatures may be preferable.

Thus, according to the present invention there is provided a process for the manufacture of aromatic isocyanates, which comprises dissolving or suspending the aromatic amine serving as the starting material in a solvent of the above formula, introducing hydrogen chloride at a temperature within the range of about 50 to about 100° C. and passing in phosgene at a temperature around 100° C. to thereby convert the hydrochloride into the isocyanate.

The reaction mixture thus obtained may be worked up by distillation or by concentration so as to cause crystallization. On distillation the amount of the resinous residue remaining in the still is very small and, accordingly, the yield of isocyanate is high. In the case of nondistillable isocyanates which are isolated by crystallization, very pure products are obtained so that the products need not be recrystallized.

The invention is further illustrated by the following examples without being restricted thereto, all parts being by weight:

Example 1

122 parts of a mixture of 80% of 2,4- and 20% of 2,6-diamino-toluene prepared by nitrating toluene to form dinitro-toluene by reducing the latter are mixed with 600 parts of phenyl-n-butylsulfone. Then dry hydrogen chloride is passed in at a temperature of about 70° C. until the mixture is saturated. Now a strong stream of phosgene is introduced while raising the temperature to about 90° C. The hydrochloride is thereby dissolved within 1½ hour. The phosgenation is completed by raising the temperature to 120° C. and maintaining the mixture at this temperature for 15 minutes. By passing in dry carbon dioxide, hydrogen chloride and excess phosgene are removed from the mixture. By distillation in vacuo 171 parts of toluylene-diisocyanate are obtained, which corresponds to a yield of 89%.

The same result is obtained when, instead of phenyl-n-butylsulfone, phenyl-methyl-sulfone, phenyl-ethyl-sulfone, phenyl-n-propyl-sulfone, phenyl-isopropyl-sulfone, or phenyl-n-isobutyl-sulfone or a sulfone in which the benzene nucleus is substituted, such as o-tolyl-methyl-sulfone and 2,4-dimethylphenyl-methylsulfone, is used as the solvent in the manufacture of the hydrochloride. In the case of sulfones which melt above room temperature, mixing of the amine with the sulfone is effected at a temperature above the melting point.

Example 2

61 parts of 2,4-diamino-toluene are mixed with 422 parts of benzenesulfofluoride. The mixture is heated to 50° C. and saturated with dry hydrogen chloride, the temperature rising to about 90 to 100° C. Then phosgene is introduced at 90° C. at a rate of 1,3 parts per 1 minute. After becoming clear (which takes about 2½ hours) the solution is treated with phosgene another ½ hour at the same temperature. Then hydrogen chloride and excess phosgene are removed by blowing with carbon dioxide at 100° C. for 1 hour. The reaction mixture is at first distilled without using a column, whereby 506 parts of a mixture of benzenesulfofluoride and toluylene-diisocyanate (B.P. 55 to 95° C./2 mm.) and 4.9 parts of a dark resinous residue are obtained. The distillate contains 81.7 parts (94% of the theoretical yield) of toluylene-diisocyanate as shown by analysis. By fractionating the distillate through a packed column the following fractions are obtained:

419 parts of benzenesulfofluoride, B.P. 65° C./4 mm. (89% of the amount used)

5.5 parts of a middle fraction, B.P. 66 to 96° C./3 mm.
67.7 parts of pure diisocyanate, B.P. 96 to 97° C./3 mm.
The balance of the isocyanate remains in the column as may be established by washing with chlorobenzene and titration.

*Example 3*

79 parts of 1,5-diamino-naphthalene are dissolved in 550 parts of benzenesulfofluoride and the mixture is saturated with hydrogen chloride at 100° C. Then phosgene is passed in at 90° C. After 7 hours the solution becomes clear whereupon introducing of phosgene is continued for another hour. The reaction mixture is blown with carbon dioxide and worked up by distilling off half of the sulfofluoride (275 parts) in vacuo. On cooling the diisocyanate crystallizes. Yield: 93.5 parts corresponding to 89% of the theoretical. M.P.: 130 to 132° C.

*Example 4*

68 parts of 4,6-diamino-1,3-xylene are dissolved with heating in 340 parts of benzenesulfofluoride. By introducing hydrogen chloride at a temperature within the range of 50 to 90° C. the hydrochloride is formed. The phosgenation takes 2½ hours when effected by introducing phosgene at 110° C. On blowing with carbon dioxide the reaction mixture is worked up as described in Example 2, i.e. by distillation at first without using a column and then through a column. On distillation a resinous residue of 5 parts remains in the still. By subsequently fractionating the distillate the diisocyanate (B.P. 116° C./5 mm.) is separated from the solvent (B.P. 65° C./4 mm.). On cooling the diisocyanate solidifies. M.P.: 71° C. The yield amounts to 88.5 parts (94%) of 1,3-xylene-4,6-diisocyanate.

*Example 5*

61 parts of 2,4-diamino-toluene are dissolved in 305 parts of melted benzenesulfonic acid-phenyl ester at 50° C. The mixture is saturated with hydrogen chloride to thereby form the hydrochloride of the diamino-toluene. The phosgenation is effected by passing in phosgene for 3 hours at 60° C. The reaction mixture is blown with carbon dioxide and distilled in vacuo whereby the diisocyanate (B.P. 123° C./12 mm.) is obtained as first fraction and the solvent (B.P. 196° C./12 mm.) as last fraction. Yield: 77.5 parts of toluylene-diisocyanate, which corresponds to 89% of the theoretical.

*Example 6*

61 parts of 2,4-diamino-toluene are dissolved in 427 parts of melted benzenesulfonic acid-diethyl amide at 50° C. and the mixture is saturated with hydrogen chloride. Then phosgene is passed in for 3 hours at 90° C. On blowing with carbon dioxide the solution is worked up by distillation whereby the diisocyanate (B.P. 123° C./12 mm.) is obtained as first fraction and the solvent B.P. (176° C./12 mm.) as last fraction. The yield of toluylene-diisocyanate is 78.5 parts (90% of the theoretical).

We claim:
1. In the process for the production of di- and polyisocyanates in which phosgene is reacted with a hydrochloride of an aromatic amine, the improvement which comprises effecting said reaction with an amine hydrochloride formed by mixing an aromatic amine selected from the group consisting of primary aromatic diamines and primary aromatic polyamines with a solvent having the general formula

$$R-SO_2-X$$

in which R is a member selected from the group consisting of phenyl and lower alkyl substituted phenyl radicals and X is a member selected from the group consisting of lower alkyl radicals, fluorine, the phenoxy radical, and di-lower alkylamino radicals, and passing in hydrogen chloride at a temperature between about 50 and 100° C.

2. Improvement according to claim 1, in which said solvent is benzenesulfofluoride.
3. Improvement according to claim 1, in which said solvent is phenyl-n-lower alkylsulfone.
4. Process for the production of aromatic amine hydrochlorides suitable for conversion by phosgenation into di- and polyisocyanates which comprises mixing an aromatic amine selected from the group consisting of primary aromatic diamines and primary aromatic polyamines with a solvent having the general formula $$R-SO_2-X$$

in which R is a member selected from the group consisting of phenyl and lower alkyl substituted phenyl radicals and X is a member selected from the group consisting of lower alkyl radicals, fluorine, the phenoxy radical, and di-lower alkylamino radicals, and passing in hydrogen chloride at a temperature between about 50 and 100° C.

5. Process according to claim 4, in which said solvent is phenyl-n-lower alkylsulfone.
6. Process according to claim 4, in which said solvent is benzenesulfofluoride.
7. Improvement according to claim 1, in which said reaction with phosgene is effected at a temperature of about 100° C.

References Cited in the file of this patent
UNITED STATES PATENTS

| | | |
|---|---|---|
| 2,326,501 | Siefken et al. | Aug. 10, 1943 |
| 2,379,948 | Burgoine et al. | July 10, 1945 |
| 2,644,007 | Irwin | June 30, 1953 |

FOREIGN PATENTS

| | | |
|---|---|---|
| 870,097 | Germany | Mar. 9, 1953 |

UNITED STATES PATENT OFFICE
CERTIFICATE OF CORRECTION

Patent No. 2,901,497                                                                     August 25, 1959

Detlef Delfs et al

It is hereby certified that error appears in the above numbered patent requiring correction and that the said Letters Patent should read as corrected below.

In the grant, lines 2, 3, and 4, for "assignors, by mesne assignments, of one-half to Mobay Chemical Company, of Pittsburgh, Pennsylvania, a corporation of Delaware," read -- assignors, by direct and mesne assignments, of one-half to Farbenfabriken Bayer Aktiengesellschaft, of Leverkusen, Germany, a corporation of Germany, and one-half to Mobay Chemical Company, of Pittsburgh, Pennsylvania, a corporation of Pennsylvania, --; lines 13 and 14, for "Detlef Delfs and Ferdinand Münz, their heirs or assigns, and Mobay Chemical Company, its successors" read -- Farbenfabriken Bayer Aktiengesellschaft and Mobay Chemical Company, their successors --; in the heading to the printed specification, lines 4, 5, and 6, for "assignors, by mesne assignments, of one-half to Mobay Chemical Company, Pittsburgh, Pa., a corporation of Delaware" read -- assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware, --.

Signed and sealed this 12th day of April 1960.

(SEAL)
Attest:

KARL H. AXLINE                                            ROBERT C. WATSON
Attesting Officer                                        Commissioner of Patents